US005694768A

United States Patent [19]
Johnson et al.

[11] Patent Number: 5,694,768
[45] Date of Patent: Dec. 9, 1997

[54] VARIABLE CYCLE TURBOFAN-RAMJET ENGINE

[75] Inventors: James Edward Johnson, Hamilton; Elmore Verne Sprunger; John Robert Simmons, both of Cincinnati, all of Ohio

[73] Assignee: General Electric Company, Cincinnati, Ohio

[21] Appl. No.: 484,083

[22] Filed: Feb. 23, 1990

[51] Int. Cl.$^6$ .............................. F02K 3/02; F02K 3/075
[52] U.S. Cl. ........................ 60/226.3; 60/262; 60/270.1
[58] Field of Search ................... 60/226.1–226.3, 60/262, 270.1

[56] References Cited

U.S. PATENT DOCUMENTS

| | | | |
|---|---|---|---|
| 3,167,911 | 2/1965 | Sandre | 60/35.54 |
| 3,238,716 | 3/1966 | Sandre | 60/35.6 |
| 3,296,800 | 1/1967 | Keenan et al. | 60/270.1 |
| 3,670,964 | 6/1972 | Pederson | 239/265.19 |
| 3,677,012 | 7/1972 | Batscha | 60/262 |
| 3,879,941 | 4/1975 | Sargisson | 60/226.01 |
| 4,010,608 | 3/1977 | Simmons | 60/226.1 |
| 4,039,146 | 8/1977 | Wagenknecht | 239/265.25 |
| 4,043,121 | 8/1977 | Thomas et al. | 60/204 |
| 4,060,981 | 12/1977 | Hampton | 60/226.1 |
| 4,064,692 | 12/1977 | Johnson et al. | 60/261 |
| 4,068,471 | 1/1978 | Simmons | 60/262 |
| 4,080,785 | 3/1978 | Koff et al. | 60/226.1 |
| 4,137,708 | 2/1979 | Aspinwall et al. | 60/204 |
| 4,175,384 | 11/1979 | Wagenknecht | 60/226.3 |
| 4,185,457 | 1/1980 | Parker et al. | 60/204 |
| 4,193,738 | 3/1980 | Landis, Jr. et al. | 415/115 |
| 4,222,235 | 9/1980 | Adamson et al. | 60/226.1 |
| 4,813,229 | 3/1989 | Simmons | 60/204 |
| 4,909,031 | 3/1990 | Grieb | 60/270.1 |
| 4,919,364 | 4/1990 | John et al. | 60/270.1 |

OTHER PUBLICATIONS

D. Dusa, "Exhaust Systems and Turboramjet Propulsion for Mach 2.0 to 6.0 Aircraft," presented at University of Tennessee Space Institute on 6 Dec. 1988, cover and pp. 15 and 16.
GE Aircraft Engines, "Technology for Today and the Year 2000," Jun. 1987, tri-fold color brochure.
Blevins et al, American Institute of Aeronautics and Astronautics (AIAA), "Variable Cycle Concepts for High Mach Applications," paper AIAA–87–2103 cover and p. 5. Jun. 1987.
GE Aircraft Engines, "Turbine Engine Symposium," 1984, single page engine drawing.
S.Birch, *Aerospace Engineering*, "Sänger Update," Aug. 1989, pp. 81–83.
*Aerospace America*, May 1987, p. 8.

Primary Examiner—Michael J. Carone
Attorney, Agent, or Firm—Andrew C. Hess; Patrick R. Scanlon

[57] ABSTRACT

An improved variable cycle turbofan-ramjet engine is disclosed. The engine includes a split fan assembly, a bypass channel surrounding a core engine and a mode selector valve for selectively bypassing air around an aft fan and the core engine. In a first, single bypass mode of operation, the mode selector valve allows air to flow through both a forward fan and the aft fan, and a portion of which bypasses the core engine. In a second, double bypass mode of operation, the mode selector valve allows air from the forward fan to bypass the aft fan and a portion of the air from the forward fan to bypass the core engine. In a third, ramjet mode of operation, the mode selector vane bypasses air around the aft fan and the core engine and the core engine is shut down for ramjet operation. In the preferred embodiment, the forward fan is allowed to windmill and powers a fuel pump connected thereto for providing fuel to a ram burner of the engine for ramjet operation.

24 Claims, 2 Drawing Sheets

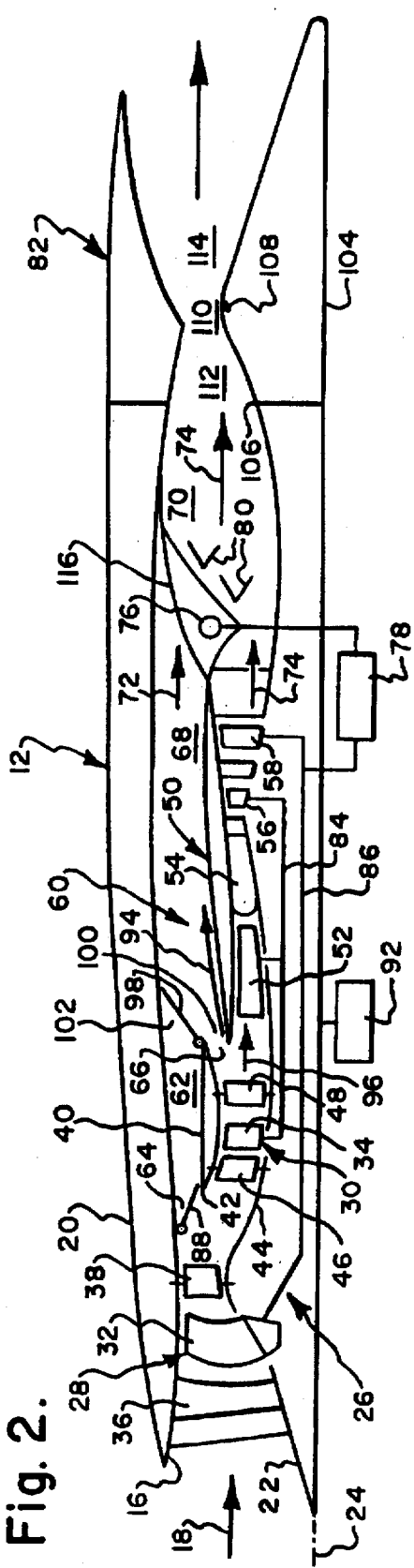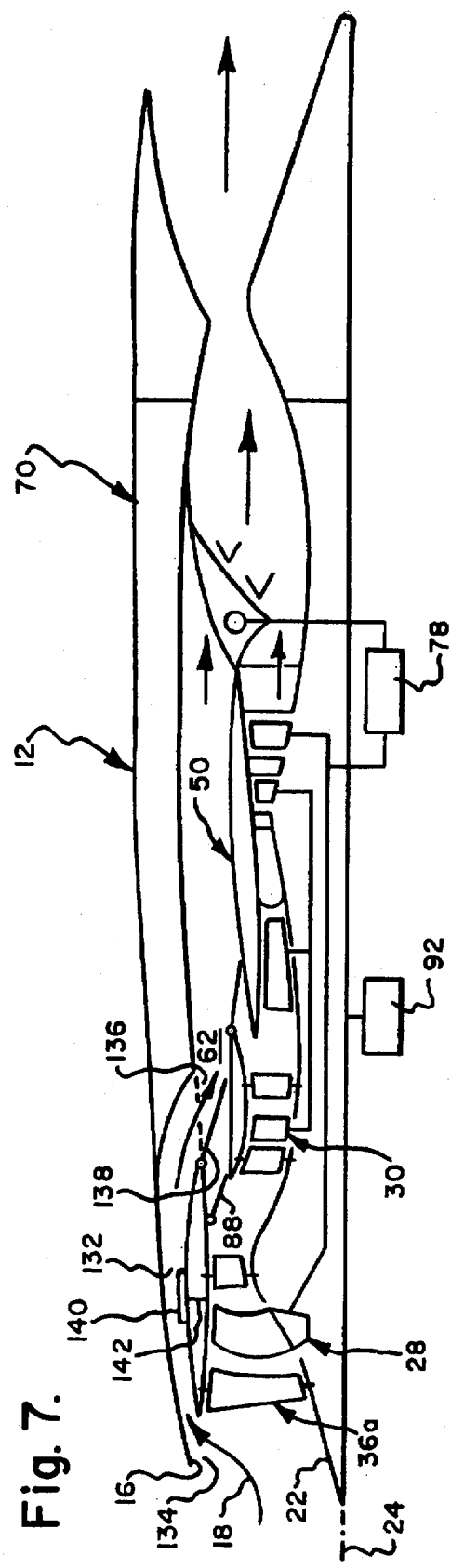

VARIABLE CYCLE TURBOFAN-RAMJET ENGINE

TECHNICAL FIELD

The present invention relates generally to gas turbine engines, and more particularly, to an improved variable cycle turbofan-ramjet engine.

BACKGROUND OF THE INVENTION

Variable cycle engines are conventionally known for powering high performance aircraft from subsonic to supersonic speeds while attempting to obtain countervailing objectives such as high specific thrust and low fuel consumption. In other words, it is desirable to have an aircraft jet engine which can operate through various modes of thrust and speed requirements with minimum consumption of fuel.

However, such an ideal aircraft jet engine must necessarily include many compromises because conventional engines such as the high bypass ratio turbofan engine is utilized at subsonic speeds, the low bypass ratio turbofan engine or turbojet engine is used at up to moderate supersonic speeds, and the ramjet engine is utilized at high supersonic speeds. These three conventional engines are structurally and functionally different and are typically not operable optimally in each others speed range.

In contrast, variable cycle engines are conventionally known to operate over a range of operating conditions. In particular, conventional variable cycle combined turbojet or turbofan and ramjet engines are known which attempt to provide for a range of operation from low subsonic Mach numbers to high supersonic Mach numbers of about Mach 6. However such conventional turbofan-ramjet engines are relatively complex and include varying disadvantages. For example, one conventional turbofan-ramjet engine includes a ram burner which is wrapped around a core engine making an undesirably large diameter engine. Or, variable coannular exhaust nozzles are utilized which are relatively complex and difficult to schedule the flow area thereof. Or, such engines include coannular, separate flow paths including a coannular inlet which provides an undesirably large inlet and which typically requires an inlet diverter valve for selectively channeling inlet air flow.

Such conventional turbofan-ramjet engines may include one or more of such undesirable structures and result in an engine which is relatively complex, heavy, large, and inefficient.

OBJECTS OF THE INVENTION

Accordingly, one object of the present invention is to provide a new and improved variable cycle turbofan-ramjet engine.

Another object of the present invention is to provide a turbofan-ramjet engine having a relatively small diameter.

Another object of the present invention is to provide a turbofan-ramjet engine operable in an aircraft from takeoff through subsonic, sonic, and relatively high supersonic speeds.

Another object of the present invention is to provide an improved turbofan-ramjet engine which is relatively simple and includes a single annular inlet and a single exhaust nozzle.

BRIEF DESCRIPTION OF THE DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

FIG. 2 is a schematic representation of the variable cycle turbofan-ramjet engine powering the aircraft illustrated in FIG. 1 shown in a first, single bypass mode of operation.

FIG. 7 is a schematic representation of a variable cycle turbofan-ramjet engine in accordance with another embodiment of the present invention.

DISCLOSURE OF THE INVENTION

In a preferred, exemplary embodiment of the invention a variable cycle turbofan-ramjet engine for powering an aircraft includes a split fan assembly having forward and aft fans, and a core engine disposed downstream therefrom. The engine also includes an augmenter and an exhaust nozzle disposed downstream from the core engine. A bypass duct surrounds the aft fan and core engine and is in selective flow communication with the forward fan and the aft fan. A mode selector valve is disposed in a forward bypass duct and is positionable in response to a control means for operating the turbofan-ramjet engine in a first, single bypass, mode wherein the mode selector valve is closed and air is channeled through the forward and aft fans and then through both the forward bypass duct and the core engine; and a second, double bypass, mode wherein the mode selector valve is open and air is channeled from the forward fan to bypass in part both the aft fan and the core engine; and a third, ramjet, mode wherein the mode selector valve is positioned in an open position and the core engine is shut down, and the augmenter is activated for operating the engine as a ramjet.

Mode(s) for Carrying Out the Invention

Figure 1:
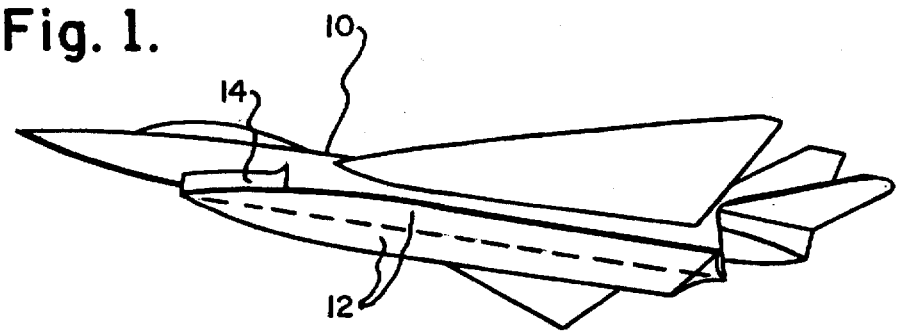
FIG. 1 is a perspective view of a high performance aircraft powered by two side by side variable cycle turbofan-ramjet engines in accordance with one embodiment of the present invention.

Illustrated in FIG. 1 is a schematic representation of a high performance aircraft configured for operation at speeds up to about Mach 6. The aircraft 10 includes two variable cycle turbofan-ramjet engines 12 in accordance with a preferred, exemplary embodiment of the present invention. The aircraft 10 includes a conventional aircraft inlet 14 which is effective for channeling airflow to the engine 12. For example, at supersonic speeds, the inlet 14 is effective for diffusing air which enters the inlet 14 for providing to the engine 12 air at subsonic velocities.

Figure 3:
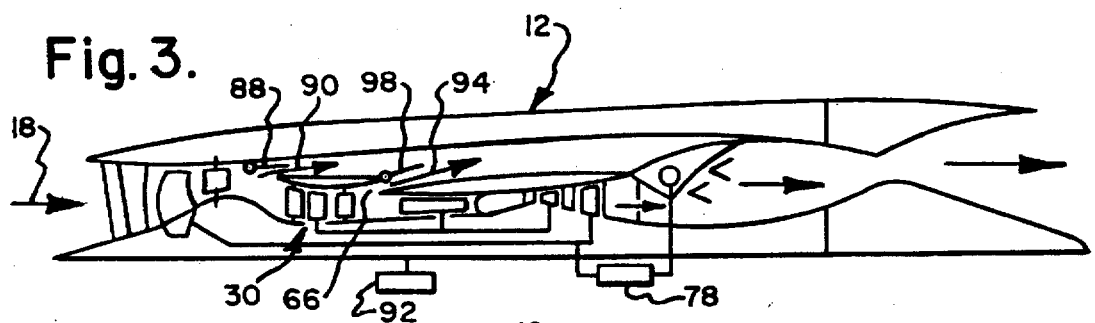
FIG. 3 is a schematic representation of the variable cycle turbofan-ramjet engine powering the aircraft illustrated in FIG. 1 shown in a second, double bypass, mode of operation.
Figure 4:
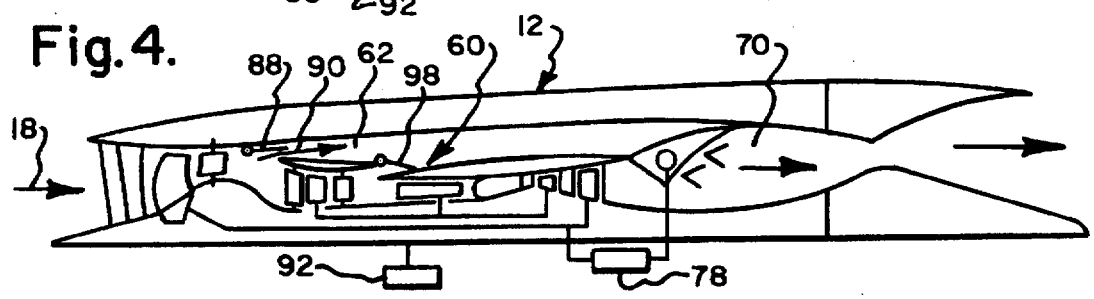
FIG. 4 is a schematic representation of the variable cycle turbofan-ramjet engine powering the aircraft illustrated in FIG. 1 shown in a third, ramjet, mode of operation.

FIGS. 2–4 illustrate schematically the engine 12 in accordance with one embodiment of the present invention operable in three modes of operation. FIG. 2 shows a configuration of the engine 12 when operated in a first, single bypass, mode of operation. The engine 12 includes a tingle annular inlet duct 16 for receiving ambient air 18 from the aircraft inlet 14. The duct 16 is defined between an outer casing or nacelle 20 and an inner conical hub 22 both disposed concentrically about a longitudinal centerline axis 24 of the engine 12.

The engine 12 further includes a split fan assembly 26 which includes a forward fan 28 disposed in the inlet duct 16 and an aft fan 30 disposed downstream from the forward fan 26 in flow communication therewith. The fans 28 and 30 preferably each include a single row of a plurality of circumferentially spaced fan blades 32 and 34, respectively. Conventional inlet guide vanes 36 are disposed in the inlet 16 upstream of the forward fan 28 and extend between the casing 20 and the hub 22, and conventional variable outlet guide vanes 38 are disposed in the inlet 16 immediately downstream of the forward fan 28 and extending between the hub 22 and the casing 20.

The aft fan 30 includes an outer casing 40 defining a flow splitter 42 at an upstream end thereof, and an inner casing 44 spaced radially inwardly from the outer casing 40. The aft fan 30 includes conventional variable inlet guide vanes 46 disposed upstream of the blades 34 and conventional variable outlet guide vanes 48 disposed downstream of the blades 34.

The engine 12 further includes a core engine 50 disposed downstream from the aft fan 30 and in flow communication therewith. The core engine 50 conventionally includes in turn a compressor 52, combustor 54, high pressure turbine (HPT) 56 and a low pressure turbine (LPT) 58. In a preferred embodiment, the HPT 56 and the LPT 58 each includes a single row of a plurality of circumferentially spaced turbine rotor blades.

A bypass channel 60 surrounds the aft fan 30 and the core engine 50 and includes a forward bypass duct 62 surrounding the aft fan 30 and has an inlet 64 in selective flow communication with the forward fan 28. The bypass channel 60 also includes an intermediate bypass duct 66 disposed between the aft fan 30 and the core engine 50 in flow communication with the aft fan 30. The bypass channel 60 also includes an aft bypass duct 68 surrounding the core engine 50 and in flow communication with both the forward and intermediate bypass ducts 62 and 66.

A conventional augmenter 70, which may be alternatively referred to as a ram burner since it operates also in a ramjet mode of operation of the engine 12, is disposed downstream from both the core engine 50 and the bypass channel 60 and receives bypass air 72 from the bypass channel 60 and core engine combustion discharge gases 74 from the core engine 50. The augmenter 70 includes a plurality of conventional fuel injectors 76 shown schematically in FIG. 2 which are operatively connected to a conventional fuel pump 78. Conventional flameholders 80 are included in the augmenter 70 and are disposed downstream from the fuel injectors 76.

A conventional variable area converging-diverging exhaust nozzle 82 is disposed downstream from the augmenter 70 and in flow communication therewith.

The aft fan 30, the compressor 52, and the HPT 56 are conventionally disposed on a first rotor shaft 84, and the forward fan 28 and the LPT 58 are conventionally disposed on a second rotor shaft 86. The first and second rotor shafts 84 and 86 are independently rotatable.

In accordance with a preferred embodiment of the present invention, the engine 12 further includes a mode selector valve 88 which may be a conventional valve which is disposed in the forward bypass duct inlet 64 and is operable in a first, open position (shown in FIGS. 3 and 4) allowing a first portion 90 of the air 18 from the forward fan 28 to enter the forward bypass duct 62, and a closed position preventing the air 18 from the forward fan 28 from entering the forward bypass duct 62.

Conventional control means 92 for controlling the engine 12 including the mode selector valve 88 are provided for operating the engine 12 in three modes of operation.

The three modes include a first, single bypass, mode illustrated in FIG. 2 wherein the mode selector valve 88 is positioned in the closed position and all of the air 18 is channeled through the forward fan 28 and the aft fan 30 and then through both the intermediate bypass duct 66 and the core engine 50. More specifically, a second portion 94 is bypassed through the intermediate bypass duct 66 around the core engine 50 and a third, remaining portion 96, of the air 18 which enters the inlet duct 16 is channeled through the core engine 50.

The second, double bypass mode is illustrated in FIG. 3 and includes the mode selector valve 88 positioned in the open position and the air 18 is channeled from the forward fan 28 to both the forward bypass duct 62 and the aft fan 30, and the air from the aft fan 30 is channeled to both the intermediate bypass duct 66 and the core engine 50.

The third, ramjet mode is illustrated in FIG. 4 and includes the mode selector valve 88 positioned in the open position, the core engine 50 is shut down so that combustion in the combuster 54 does not occur for powering the HPT 56 and the LPT 58, and the augmenter 70 is activated as a ram burner for burning the bypass air 72 with fuel from the fuel injectors 76 in the ramjet mode of operation. The augmenter 70 is also conventionally operable in both the first and second modes of operation for providing additional thrust as desired.

In the third, ramjet mode, the core engine 50 is shut down as illustrated in FIG. 4, and the air 18 channeled through the forward fan 28 is in turn channeled through the bypass channel 60 to the ram burner 70 for conventional ramjet operation. Since the core engine 50 is shut down, flow resistance is provided by the aft fan 30 and the core engine 50 and therefore substantially little, if any, of the air 18 from the forward fan 28 is channeled through the core engine 50. In the third, ramjet mode, the first rotor shaft 84 will not rotate or will rotate at relatively small rotational speeds since the pressure drop across the aft fan 30 and the core engine 50 is inadequate to significantly drive those elements. However, inasmuch as a single row of the fan rotor blades 32 is provided in the forward fan 28, the air 18 passing through the forward fan 28 causes the fan 28 to windmill and thus rotate the second rotor shaft 86. Means (not shown) could be used in an alternative embodiment of the invention to prevent the forward fan from rotating. However, in the preferred embodiment, it is desirable to allow the forward fan 28 to windmill and rotate the second rotor shaft 86 for powering the fuel pump 78 which is operatively connected thereto. Since the core engine 50 is shut down the conventional accessories associated therewith including a conventional fuel pump for providing fuel to the combustor 54 is inoperable. By operatively connecting the fuel pump 78 to the second rotor shaft 86 and allowing the forward fan 28 to windmill in the third, ramjet mode fuel can be provided to fuel injectors 76 in the augmenter 70 in a facile manner.

This is one reason why the split fan assembly 26 is preferred. By splitting the fan assembly 26 into the forward fan 28 and the aft fan 30 only the forward fan 28 need be rotated during the third, ramjet mode thus resulting in a simpler engine 12. Rotation of the aft fan 30 in the third, ramjet mode is undesirable because energy would be wasted by rotating the aft fan 30 and the compressor 52 and HPT 56 connected thereto through the first rotor shaft 84. Use of the split fan assembly 56 is also preferred because it reduces the fan pressure ratio of the fan assembly 26 and correspondingly lowers the engine overall pressure ratio which is the total pressure in the inlet duct 16 over the total pressure at the discharge of the compressor 52. This reduces the temperature of the compressed air discharged from the compressor 52 at high Mach operation of the engine 12 which therefore allows for reduced amounts of cooling of the core engine 50.

The fuel pump 78 may be used for powering the engine 12 in all three modes of operation or, alternatively, a conventional fuel pump (not shown) conventionally driven by the first rotor shaft 84 may be used to provide fuel to the fuel injector 76 during the first and second modes of operation, while during the third mode of operation, fuel is provided to the fuel injector 76 by the fuel pump 78 connected to the second rotor shaft 86.

In yet other embodiments of the invention, the fuel pump 78 may, instead of being connected to and powered by the second rotor shaft 86, be powered by a conventional ram-air turbine system (not shown) during the ramjet mode of operation. Such conventional ram-air turbine system includes a turbine which is deployable in position in the freestream air flowing past the aircraft 10 to turn the turbine to drive the fuel pump 78 connected thereto, as well as drive other accessories such as an electrical generator.

In accordance with another embodiment of the present invention, the engine 12 may further include a bypass valve 98 disposed in the intermediate bypass duct 66. The bypass valve 98 is shown as preferably extending from an outlet 100 of the intermediate bypass duct 66. The bypass valve 98 is operable in a closed position as illustrated in FIG. 4 for closing the intermediate bypass duct 66 for preventing the air 18 from the aft fan 30 from bypassing the core engine 50 in the third, ramjet mode. The bypass valve 98 is also operable in an intermediate position as illustrated in FIG. 3 for allowing at least some air from the aft fan 30 to bypass the core engine 50 during the second mode. The bypass valve 98 is also operable in a third position for closing an outlet 102 of the forward bypass duct 62 and for allowing unrestricted flow of the second portion 94 of the air 18 through the intermediate bypass duct 66.

The conventional control means 92 is also effective for positioning the bypass valve 98 in the closed position in the third mode and in the intermediate position in the second mode. The control means 92 is effective also for positioning the bypass valve 98 in the third position in the first mode. The control means 92 is effective also for positioning the bypass valve 98 at the intermediate position in the second mode for balancing static pressure between the forward and intermediate bypass ducts 62 and 66. In a preferred embodiment the bypass valve 98 may comprise a conventional variable area bypass injector (VABI) valve.

The mode selector valve 88 and the bypass valve 98 may comprise any conventional valves operable for carrying out the functions recited hereinabove.

The exhaust nozzle 82 is conventional and may comprise a nozzle including a axially translatable plug 104 as illustrated in FIG. 2 which extends rearwardly in the augmenter 70 from a radially inner annulus at an outlet end of the augmenter 70. The plug 104 has a maximum diameter 108 which defines a throat 110 in the exhaust nozzle 82 for channeling the combustion gases 74 from the augmenter 70. The plug 104 is conventionally translatable in the axial direction along the engine centerline 24 for varying the flow area of the throat 110 and for varying the flow area of a converging section 112 disposed upstream from the throat 110 and a diverging section 114 disposed downstream from the throat 110.

The engine 12 preferably also includes a conventional mixer 116 extending downstream from the core engine 50 for mixing the bypass air 72 with the combustion gases 74 during the first and second modes.

Figure 5:
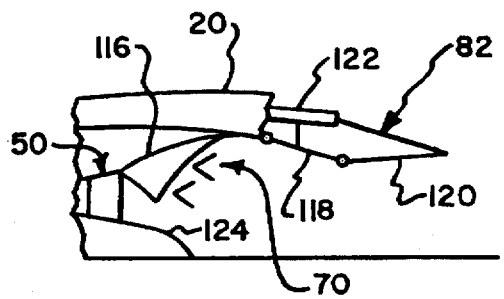
FIG. 5 is a schematic representation of an alternate embodiment of a variable exhaust nozzle usable in the turbofan-ramjet engine illustrated in FIGS. 2–4.

Illustrated in FIG. 5 is an alternate embodiment of the exhaust nozzle 82 which includes a conventional primary exhaust flap 118 extending rearwardly from the augmenter 70 and a conventional secondary flap 120 extending rearwardly from the primary flap 118. The primary and second flaps 118 and 120 are conventionally moveable by means 122 for changing the flow area of the exhaust nozzle 82. In the embodiment illustrated in FIG. 5 a relatively small conventional exhaust cone centerbody 124 extends rearwardly from the core engine 50 and ends upstream of the exhaust nozzle 82.

Figure 6:
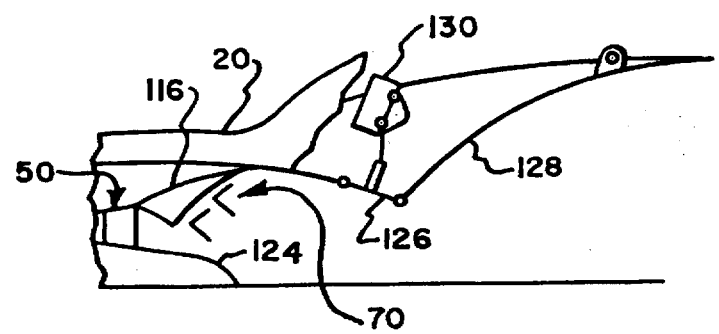
FIG. 6 is a schematic representation of another embodiment of a variable exhaust nozzle usable in the turbofan-ramjet engine illustrated in FIGS. 2–4.

Illustrated in FIG. 6 is another embodiment of exhaust nozzle 82 which may be used in the engine 12. It is generally similar to the nozzle illustrated in FIG. 5 and includes a primary exhaust flap 126 extending rearwardly from the augmenter 70 and a secondary exhaust flap 128 extending rearwardly from the primary flap 126. The primary and second flaps 126 and 128 are conventionally moveable by means 130 contained in the nozzle 82. The secondary flaps 128 provide a relatively large bell-shaped exhaust outlet to the engine 12 for more efficient operation at relatively high Mach numbers during the third mode of operation when utilizing fuel such a hydrogen, for example.

The turbofan-ramjet engine 12 in accordance with the present invention is usable for powering the aircraft 10 at relatively high altitudes and relatively high Mach numbers. The control means 92 effects the first mode at speeds of the aircraft 10 up to about Mach 2.5, and the second mode at speeds of the aircraft 10 from about Mach 2.5 up to about Mach 3.0, and the third mode at speeds of the aircraft 10 from about Mach 3.0 up to about Mach 6.0. When the expected maximum speed of the aircraft 10 is up to about Mach 4, conventional JP4 fuel may be used in the engine 12 during all three modes of operation. When the expected speed of the aircraft 10 is up to about Mach 5, a higher energy fuel such as methane may be used in the engine 12 for all three modes of operation. When the expected speed of the aircraft 10 is up to about Mach 6, a yet higher energy fuel such as hydrogen may be used in the engine 12 for all three modes of operation. Alternatively, means can be provided in the engine 12 for handling different fuels depending upon the degree of supersonic operation of the aircraft 10. Such means (not shown) could allow for selective channeling of either JP4 fuel, methane, or hydrogen, in the engine 12 provided suitable conventional apparatus is used for delivering such fuels in the engine 12 for combustion. Other suitable fuels may also be utilized such as other hydrocarbon fuels and conventional endothermic fuels including JP5, JP8, and MCH, for example.

Some advantages of the present invention include a relatively simple engine 12 having a single annular inlet and a single exhaust nozzle and a bypass channel 60 which collectively allows for a relatively small diameter of the engine 12. The engine 12 is relatively simple and is operable in three modes of operation including a single bypass, a double bypass, and a ramjet mode of operation, effected by use of the single mode selector valve 88. The split fan assembly 26 allows for efficient operation in the ramjet mode, for example, since only the forward fan 28 is caused to windmill when the core engine 50 is shut down. Losses in the forward fan 28 due to windmilling are relatively small and therefore acceptable when compared with the relatively large thrust output of the engine 12 during the ramjet mode of operation. The windmilling forward fan 30 may be used to provide power for driving the fuel pump 78 during the ramjet mode of operation thus reducing the number of moving parts in the engine 12 in the ramjet mode to a minimum. The arrangement of the engine 12 as above described allows for the use of a relatively simple singular variable area exhaust nozzle 82 which reduces the complexity of the engine 12. The engine 12 is effective for accomplishing an entire relatively broadly range mission including subsonic low and high supersonic speeds with relatively high specific thrust capability for accelerating the aircraft 10 rapidly from takeoff to maximum speed in the ramjet mode of operation.

Illustrated in FIG. 7 is another embodiment of the present invention which is structurally identical to the embodiment illustrated in FIGS. 2–4 except as follows. In this embodiment, conventional variable IGV's 36a are utilized and an annular auxiliary ram duct 132 surrounds the IGV's 36a, forward fan 28 and forward bypass duct 62. The ram duct 132 includes an annular inlet 134 for receiving the air 18 upstream of the IGV's 36a and an annular outlet 136 in flow communication with the forward bypass duct 62.

Disposed in the ram duct outlet 136 is a conventional ram air valve 138 which is positionable in an open position, shown in solid line, to allow ram air 18 to flow through the ram duct 132 into the forward bypass duct 62, and in a closed position, shown in dashed line to prevent the ram air 18 from flowing through the ram duct 132 and into the forward bypass duct 62. The ram air valve 138 is also positionable at intermediate positions for controlling the amount of flow channeled into the forward bypass duct 62.

This alternate embodiment is preferred for flight Mach numbers in excess of about 4.5–5.0 when the engine 12 is operated in the third, ramjet mode. The IGV's 36a are disposed in a closed position to prevent, or substantially prevent, the air 18 from entering the forward fan 28, and the ram air valve 138 is placed in its open position to allow the air 18 to flow as ram air 18 through the ram duct 132 and into the forward bypass duct 62. The position of the mode selector valve 88 in this embodiment is not significant since airflow is not being channeled therepast. In this way, the forward and aft fans 28 and 30 and the core engine 50 may be completely closed to the air 18. In which case, conventional means (not shown) for providing fuel to the augmenter 70 are provided.

In the first and second modes of operation, the ram air valve 138 is disposed in the closed position and the IGV's 36a are positioned in their normal positions.

In yet another embodiment of the invention, a fuel-ram air heat exchanger system 140, including a conventional fuel-air heat exchanger, is disposed in the ram air duct 132. The system 140 includes an air duct 142 disposed in flow communication with the forward fan 28. The system operates by conventionally channeling fuel through the heat exchanger to cool a portion of the ram air 18 passing through the ram duct 132 at flight speeds above about Mach 3.0. The cooled ram air 18 is used to cool selected engine structures, for example, it may be channeled through the air duct 142 to provide cooling air to purge, or ventilate, the engine flowpath, including the aft fan 30 and core engine 50 during either operation of the auxiliary ram duct 132, or during windmilling operation of the forward fan 28. Also in this embodiment, the mode selector valve 88 could be opened as desired for channeling a portion of the cooled ram air 18 into the bypass duct 62.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A variable cycle turbofan-ramjet engine comprising: a annular inlet duct;

a split fan assembly including a forward fan disposed in said inlet duct and an aft fan disposed downstream from said forward fan in flow communication therewith;

a core engine disposed downstream from said aft fan and in flow communication therewith;

a bypass channel surrounding said aft fan and said core engine and including:

a forward bypass duct surrounding said aft fan having an inlet in selective flow communication with said forward fan;

an intermediate bypass duct disposed between said aft fan and said core engine in selective flow communication with said aft fan; and an aft bypass duct surrounding said core engine and in flow communication with both said forward and intermediate bypass ducts;

an augmenter disposed downstream from both said core engine and said bypass channel in flow communication therewith;

an exhaust nozzle disposed downstream from said augmenter and in flow communication therewith;

a mode selector valve disposed in said forward bypass duct and operable in an open position allowing air from said forward fan to enter said forward bypass duct and in a closed position preventing air from said forward fan from entering said forward bypass duct; and control means for controlling said turbofan-ramjet engine including said mode selector valve for operating said turbofan-ramjet engine in three modes of operation including:

a first, single bypass, mode wherein said mode selector valve is positioned in said closed position and air is channeled through said forward fan and said aft fan and then through both said intermediate bypass duct and said core engine;

a second, double bypass, mode wherein said mode selector valve is positioned in said open position and air is channeled from said forward fan to both said forward bypass duct and said aft fan, and air from said aft fan is channeled to both said intermediate bypass duct and said core engine; and a third, ramjet, mode wherein said mode selector valve is positioned in said open position, said core engine is shut down, and said augmenter is activated.

2. A turbofan-ramjet engine according to claim 1 wherein said turbofan-ramjet engine is useable for powering an aircraft and said control means effects said first mode at speeds of said aircraft up to about Mach 2.5, said second mode at speeds of said aircraft up to about Math 3.0, and said third mode at speeds of said aircraft up to about Mach 6.0.

3. A turbofan-ramjet engine according to claim 1 wherein said turbofan-ramjet engine is useable for powering an aircraft and wherein fuel used to power said turbofan-ramjet engine comprises JP4 fuel for expected speeds of said turbofan-ramjet engine up to about Mach 4, methane for expected speeds of said turbofan-ramjet engine up to about Mach 5, and hydrogen for expected speeds of said turbofan-ramjet engine up to about Mach 6.

4. A turbofan-ramjet engine according to claim 1 further including a bypass valve disposed in said intermediate bypass duct and operable in a closed position for closing said intermediate bypass duct for preventing air from said aft fan from bypassing said core engine, and in an intermediate position allowing at least some air from said aft fan to bypass said core engine; and wherein said control means is effective for positioning said bypass valve in said closed position in said third mode and in said intermediate position in said second mode.

5. A turbofan-ramjet engine according to claim 4 wherein said forward bypass duct includes an outlet and said bypass valve is operable in a third position for closing said forward bypass duct outlet and for allowing unrestricted flow of air through said intermediate bypass duct; and said control means is effective for positioning said bypass valve in said third position in said first mode.

6. A turbofan-ramjet engine according to claim 5 wherein said control means is effective for positioning said bypass valve at said intermediate position in said second mode for balancing static pressure between said forward and intermediate bypass ducts.

7. A turbofan-ramjet engine according to claim 6 wherein said bypass valve is a VABI.

8. A turbofan-ramjet engine according to claim 1 wherein said core engine includes a compressor, a combustor, a high pressure turbine HPT, and a low pressure turbine LPT; and wherein said aft fan, said compressor and said HPT are disposed on a first rotor shaft and said forward fan and said LPT are disposed on an independently rotatable second rotor shaft.

9. A turbofan-ramjet engine according to claim 8 wherein said forward fan comprises a single row of a plurality of circumferentially spaced fan blades and said aft fan comprises a single row of a plurality of circumferentially spaced fan blades.

10. A turbofan-ramjet engine according to claim 8 wherein said aft fan comprises a single row of a plurality of circumferentially spaced fan blades.

11. A turbofan-ramjet engine according to claim 8 wherein said forward fan comprises a single row of a plurality of circumferentially spaced fan blades.

12. A turbofan-ramjet engine according to claim 11 wherein said forward fan is allowed to windmill in said third mode.

13. A turbofan-ramjet engine according to claim 8 wherein said forward fan is allowed to windmill in said third mode.

14. A turbofan-ramjet engine according to claim 8 further including an augmenter fuel pump operatively connected to said second rotor shaft.

15. A turbofan-ramjet engine according to claim 8 further including an augmenter fuel pump operatively connected to said second rotor shaft, and wherein said forward fan is allowed to windmill for rotating said second rotor shaft during said third mode for powering said augmenter fuel pump.

16. A turbofan-ramjet engine according to claim 8 wherein said control means is effective for starting said core engine upon leaving said third mode by positioning said mode selector valve in said closed position to allow air from said forward fan to flow through said aft fan for windmilling said aft fan to drive said first rotor shaft to allow said core engine to be started.

17. A turbofan-ramjet engine according to claim 8 wherein said exhaust nozzle comprises a variable area converging-diverging nozzle.

18. A turbofan-ramjet engine according to claim 17 wherein said exhaust nozzle includes a translatable plug extending rearwardly in said augmenter from a radially inner annulus of said augmenter, said plug having a maximum diameter defining a throat in said nozzle for channeling exhaust gases from said augmenter, and said plug being translatable for varying the flow area of said throat.

19. A turbofan-ramjet engine according to claim 17 wherein said exhaust nozzle includes a primary exhaust flap extending rearwardly from said augmenter and a secondary exhaust flap extending rearwardly from said primary exhaust flap, said primary and secondary exhaust flaps being moveable for changing flow area of said exhaust nozzle.

20. A turbofan-ramjet engine according to claim 8 further including a mixer disposed at an outlet of said core engine for mixing air from said bypass channel with combustion gases from said core engine.

21. A turbofan-ramjet engine according to claim 8 further including:

an augmenter fuel pump operatively connected to said second rotor shaft; and a mixer disposed at an outlet of said core engine for mixing air from said bypass channel with combustion gases from said core engine; and wherein said forward fan comprises a single row of a plurality of circumferentially spaced fan blades;

said aft fan comprises a single row of a plurality of circumferentially spaced fan blades;

said forward fan is allowed to windmill in said third mode; and said windmilling of said forward fan turns said second rotor shaft during said third mode for powering said augmenter fuel pump.

22. A turbofan-ramjet engine according to claim 21 wherein said control means is effective for starting said core engine upon leaving said third mode by positioning said mode selector valve in said closed position to allow air from said forward fan to flow through said aft fan for windmilling said aft fan to drive said first rotor shaft to allow said core engine to be stared.

23. A turbofan-ramjet engine according to claim 8 further including:

an auxiliary ram duct surrounding said forward fan and said intermediate bypass duct and having an inlet disposed upstream of said forward fan and an outlet in flow communication with said intermediate bypass duct;

a ram air valve disposed in said ram duct outlet positionable in an open position allowing air to flow through said auxiliary ram duct to said intermediate bypass duct and in a closed position to prevent air flow through said auxiliary ram duct to said intermediate duct; and variable inlet guide vanes disposed upstream of said forward fan.

24. A turbofan-ramjet engine according to claim 23 wherein said ram air vane open position occurs in said third mode, and said variable inlet guide vanes are disposed in a closed position during said third mode.

* * * * *